United States Patent [19]

Bayles et al.

[11] Patent Number: 5,426,004
[45] Date of Patent: Jun. 20, 1995

[54] SEPARATOR SYSTEMS FOR SILVER-IRON BATTERIES

[75] Inventors: Gary A. Bayles, Pittsburgh; George D. Leap, Plum Boro, both of Pa.

[73] Assignee: Westinghouse Electric Corporation, Pittsburgh, Pa.

[21] Appl. No.: 161,019

[22] Filed: Dec. 3, 1993

[51] Int. Cl.[6] .............................. H01M 2/16
[52] U.S. Cl. ................... 429/144; 429/219; 429/221; 429/254
[58] Field of Search ............ 429/144, 254, 219, 221

[56] References Cited

U.S. PATENT DOCUMENTS

| | | | |
|---|---|---|---|
| 2,851,511 | 9/1958 | Bikerman | 429/144 X |
| 3,749,604 | 7/1973 | Langer et al. | 136/20 |
| 3,953,241 | 4/1976 | Langer et al. | 136/145 |
| 4,048,397 | 9/1977 | Rothbauer | 429/144 X |
| 4,078,125 | 3/1978 | Brown | 429/145 |
| 4,144,301 | 3/1979 | Adams et al. | 264/126 |
| 4,234,623 | 11/1980 | Moshtev et al. | 427/54 |
| 4,356,101 | 10/1982 | Jackovitz et al. | 252/182 |
| 4,383,015 | 5/1983 | Buzzelli | 429/206 |
| 4,804,598 | 2/1989 | Jackovitz et al. | 429/254 |

FOREIGN PATENT DOCUMENTS

| | | |
|---|---|---|
| 54-50829 | 4/1979 | Japan . |
| 5795069 | 5/1980 | Japan . |

*Primary Examiner*—John S. Maples

[57] ABSTRACT

A separator for use in a silver-iron battery is provided having a case and a cover within which are disposed a positive silver electrode and negative iron electrode. A separator is provided between these two electrodes. The separator includes alternating layers of a low density, radiation-grafted polyethylene layer provided adjacent the silver electrode and a cellophane film layer provided adjacent the polyethylene layer. Additional alternating layers of polyethylene and cellophane film can be provided as desired. The separator of the present invention blocks migration of the silver ion while maintaining low resistance to electrolytic transfer. The separator of the present invention provides for improved low temperature performance for silver-iron battery cells.

6 Claims, 3 Drawing Sheets

SEPARATOR SYSTEMS FOR SILVER-IRON BATTERIES

BACKGROUND OF THE INVENTION

1. Field of the Invention

The present invention relates to multi-ply polyethylene-based separator systems for use between positive and negative plates in a silver-metal battery, particularly a silver-iron battery.

2. Description of Related Art

Silver-iron batteries are well known in the art, and are taught by Brown, in U.S. Pat. Nos. 4,078,125 and Buzzelli in 4,383,015. These patents teach the use of perforated silver sheet or expanded silver screen supports containing active silver material for positive plates, either sulfurized iron oxide negative plates according no the teaching of Jackovitz et al., U.S. Pat. No. 4,356,101, or sintered metallic iron negative plates. Brown and Buzzelli, in the above patents, both taught a multi-ply separator between positive and negative plates. The separator contained alternating porous and microporous sheets of polypropylene. One of the sheets, made of 60% to 90% porous, non-woven polypropylene, having 4 micron to 30 micron pores, was placed next to the silver electrode. The microporous polypropylene had pores of from about 0.05 micron to 3 micron diameter. Total separator thickness was generally about 0.050 to 0.075 cm.

The silver-iron battery is generally considered more stable than the silver-zinc battery. The silver-zinc battery has always presented major problems of internal electrical shorts due to zinc; dendritic growth from the negative plate through the separator system. The soluble silver in both silver-zinc and silver-iron systems has also caused some problems. One problem has been the tendency to form a silver conducting film on the separators, which could allow shorting. Both battery systems are quite expensive, and are usually restricted to applications where the energy density of the battery is critical to the total system mission. An example of such an application is a propulsion system power source for underseas vehicles.

A number of patents have issued on improved battery separator materials for use in silver batteries, most for use with silver-zinc couples. Langer et al., in U.S. Pat. Nos. 3,749,604 and 3,953,241, taught a porous, caustic resistant, polymeric support, such as polytetrafluoroethylene (TEFLON) or the like, coated on at least one side with a polymeric matrix, such as polysulfone having pore diameters of from about 5 microns to 50 microns, containing inorganic filler particles. This separator was found useful for silver-zinc or silver-iron couples.

Moshtev et al., in U.S. Pat. No. 4,234,623, taught a five layer battery separator for alkali accumulator batteries. The separator contained, in order: inert, outside polyester layer; cellulose material, such as cotton, impregnated with methacrylic acid; central, irradiated, activated, low density polyethylene film, about 35 microns thick, graft polymerized with methacrylic acid, where there was a high degree of grafting, i.e, 80+%; cellulose material, such as cotton, impregnated with methacrylic acid; and inert, outside polyester layer. The minimum separator thickness, prior to any pressing for such a separator, was about 495 microns.

Nagamine et al., Japanese Patent Kokai No. 54-50829 (Application No. 52-116415), relates to separators for silver-zinc mercurate button cells. The separator contained, in order: outer cellophane film; porous, synthesized, high-molecular weight polyethylene, polypropylene, polytetrafluoroethylene, or polyester film; and outer cellophane film. Another embodiment of the separator contained one piece of cellophane film, and either one or two pieces of porous, synthesized, high-molecular weight polyethylene, polypropylene, or polytetrafluoroethylene film.

Nagamine et al. Japanese Patent Kokai No. 57-95069 (application No. 55-171763), relates to a laminated separator for silver-zinc button cells. The laminated separator contained, in order: irradiated, polyethylene film, graft polymerized with acrylic acid or meth-acrylic acid next to the silver anode material; cellophane film; irradiated polyethylene film, graft polymerized with acrylic acid or meth-acrylic acid; an outside single or double cellophane sheets. The prior art was characterized in Table 1 of this patent as cellophane film sandwiched by two pieces of graft polymerized polyethylene films with equal graft rates.

Adams et al., in U.S. Pat. No. 4,144,301, taught a deposited film or shaped envelope separator, for use in electrolytic cells. This separator contained a single sheet of irradiated, low density polyethylene, or polypropylene, graft polymerized with acrylic acid or meth-acrylic acid.

Many of these separator materials may be somewhat resistant to oxidation by divalent silver ions, many of them may also allow cellophane degradation by silver ions, and most would allow long term diffusion found to be subject to hydrolytic attack and to degrade an electrolyte at temperatures over 45° C. Polypropylene cellophane combinations have been found to allow large scale silver mirror build-up, which over a long period time could cause shorts between any silver-metal battery couple. The separator can be the weakest component in a sophisticated battery, and generally is the primary life-limiting source for silver-iron batteries, since the iron electrode is stable, unlike zinc electrodes.

In silver-based cells, cellophane film is generally used in a sacrificial manner to trap migrating silver ions. In this process, the cellophane film is broken down. The breakdown of the cellophane film, combined with the general instability and solubility of cellophane in alkaline media, contributes to a chemical, and finally a mechanical, deterioration of the cellophane film. In silver cells using only cellophane film as the separator, the deterioration of the cellophane film permits pieces of cellophane to become mobile in the cell's electrolyte. In a worst case, the breakdown of the cellophane film may expose the positive and negative plates to one another, causing a hot short condition to develop. The typical remedy to this problem is to use from 5 to 7 wraps of cellophane to delay the overall breakdown of the cellophane film and extend the cellophane life.

In response to the problems associated with the prior art, Jackovitz et al. in U.S. Pat. No. 4,804,598, describe a separator system for silver-iron batteries, where the separator system contains at-least a layer of low density polyethylene, graft polymerized with an acrylic material, disposed next to the silver electrodes; and at least a layer of high density polyethylene, graft-co-polymerized with an acrylic material, disposed next to the iron electrodes. A layer of cellophane can also be included next to the low density polyethylene and a middle layer of low density polyethylene can be included between the cellophane and the high density polyethylene. The cross-linking of the polyethylene layers serves to increase the electrolytic resistance of the separator layer and therefore the resistance of the silver-iron battery cell. Because of this high resistance, this separator has limited applicability in low temperature high power applications. Consequently, there is a need for an improved separator system for use in silver-iron cells capable of improved low temperature high power performance.

SUMMARY OF THE INVENTION

A separator for use in a silver-iron battery is provided having a case and cover within which are disposed an iron electrode and a silver electrode. The separator is provided between the iron electrode and silver electrode. The separator includes a first layer of a low-density radiation-grafted polyethylene material and a second layer of a cellophane film provided adjacent thereto. The polyethylene material is provided adjacent to the silver electrode. In addition, additional layers of alternating series of polyethylene and cellophane can be applied if desired.

Being low-density, the polyethylene material used in the separator of the present invention is non cross-linked. By using a material that is not cross-linked, the present separator provides a battery cell having a lowered cell resistance. The improved separator of the present invention allows for rapid transport of electrolyte ions while retarding migration of silver ions. In this manner, the separator of the present invention provides improved high-rate discharge performance and improved low-temperature performance of the silver-iron battery cell.

DETAILED DESCRIPTION OF THE PREFERRED EMBODIMENTS

Figure 1:
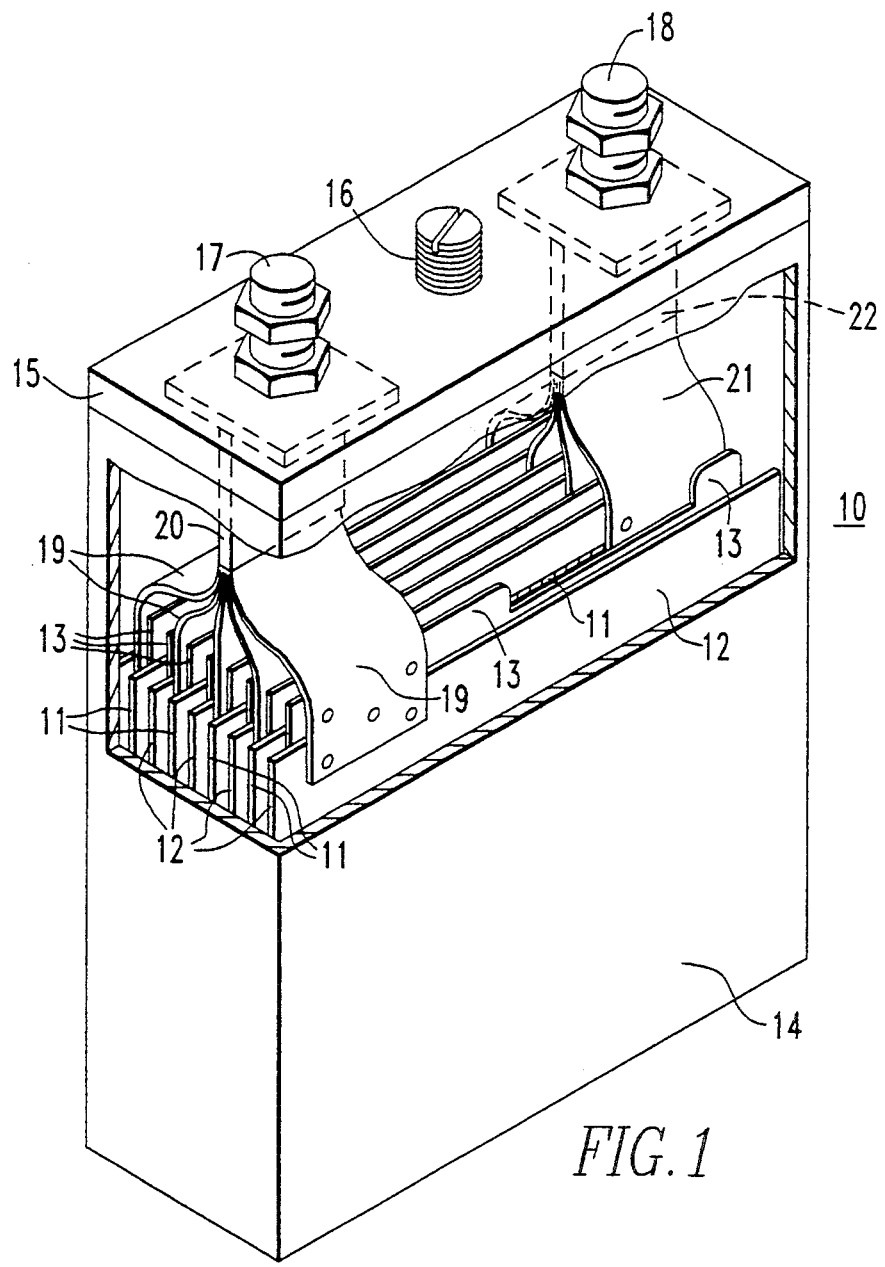
FIG. 1 shows a perspective view of one embodiment of a silver-iron battery containing the separator system of this invention.

Referring to FIG. 1, silver-metal battery 10, such as a silver iron battery, is shown having a plurality of positive silver electrode plates 11, a plurality of negative electrode plates, preferably iron electrode plates 12, and plate separators 13 between the positive plates 11 and negative plates 12. The electrode plates 11 and 12 and separator 13 are housed in case 14, having cover 15, optional vent 16, negative terminal 17, and positive terminal 18. Negative electrical lead tabs 19 are shown attached to intercell connection lug 20 and positive electrical lead tabs 21, disposed 180° away from the negative tabs 19, are shown attached to intercell connection lug 22. These lugs and tabs provide means for making electrical connections to the respective plates. A suitable alkaline electrolyte, generally 25% to 45% aqueous KOH, with possible additions of minor amounts of alkali metal hydroxide, such as lithium hydroxide, contact the electrode plates 11 and 12 and separator 13 within the case 14.

The silver electrode plates 11 may be made of perforated silver sheet, expanded silver screen, or silver powder particles bonded to an .least one suitable metal or metal coated support-current collector. All types of silver electrodes can be used as the positive plate in this invention as long as it has a porous structure, preferably from about 50% to 80% porous.

The well known, fiber metal iron electrode structure can be used as the negative plates 12 in this invention. This is a flexible, expansible, compacted sheet of relatively smooth, generally contacting, intermingled, metal fibers. Generally, the fibers when they are round have diameters between about 0.00051 to 0.0127 cm. The plaque porosity is preferably between 75% and 95% porous. Further details of this type of structure, and suitable iron active materials that can be used therewith, can be found in U.S. Pat. No. 4,078,125, incorporated herein by reference.

Figure 2:
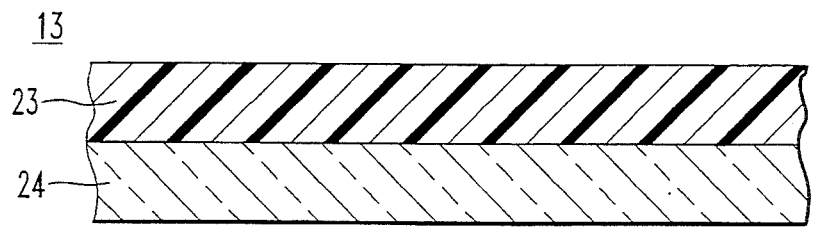
FIG. 2 shows a sectional view of one embodiment of the preferred multi-ply separator of this invention containing two layers.

Referring now to FIG. 2, the preferred separator 13 of this invention is shown in detail. This preferred separator can be utilized in any fashion to separate the positive silver electrode 11 from the negative iron electrodes 12, as long as a polyethylene layer of separator 13 contacts the face of the silver electrode 11. In the embodiment shown in FIG. 2, separator 13 is shown having two layers. They are a low-density radiation-grafted polyethylene layer 23 and a cellophane layer 24 provided adjacent thereto. Being low-density, polyethylene layer 23 is not cross-linked with any acrylic acids or methacrylic derivatives. Since polyethylene is not cross-linked, separator 13 has a lower electrolytic resistance to the transfer of hydroxyl ions than prior art separators. By using a material that is not cross-linked, the present separator 13 provides for a silver-iron cell 10 having a lowered cell resistance.

Figure 3:
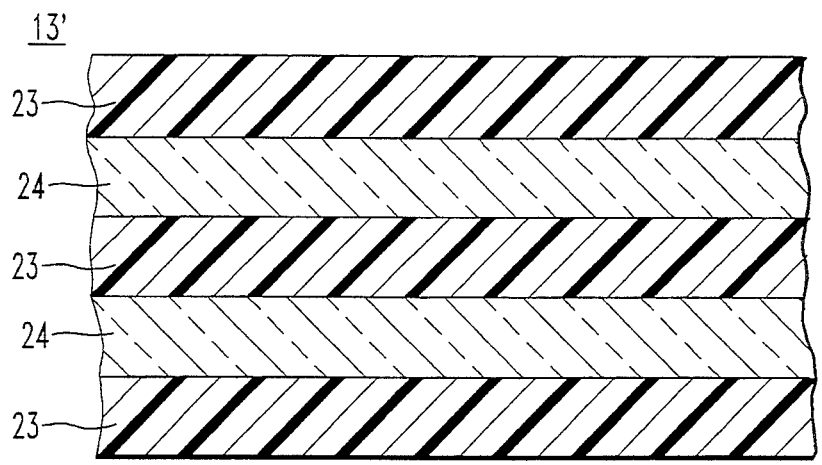
FIG. 3 shows a sectional view of a second embodiment of the preferred multi-ply separator of this invention, containing three layers.

FIG. 3 shows an alternative embodiment for separator 13′. In FIG. 3, at least one additional polyethylene layer 23 is provided adjacent the unexposed side of cellophane layer 24. If desired, and as illustrated additional alternating layers of cellophane 24 and low-density, radiation-grafted polyethylene 23 can be applied to separator 13 or 13′.

The combination of polyethylene layer 23 and cellophane layer 24 serves as the fundamental building block for separator system 13 that retards silver migration, thereby inhibiting electrochemical shorts which decrease cycle life. At the same time, separator 13 allows rapid passage of electrolyte ions, thereby reducing cell resistance. By the addition of alternating layers of polyethylene 23 and cellophane 24, the cycle life of separator 13 can be increased with a corresponding increase in cell resistance. The additional alternating layers need not be added in increments of two. Separator system 13′; having polyethylene layers 23 at either end, is as perfectly acceptable as separator 13 having a polyethylene layer 23 on one side and a cellophane layer 24 on the other.

Figure 4:
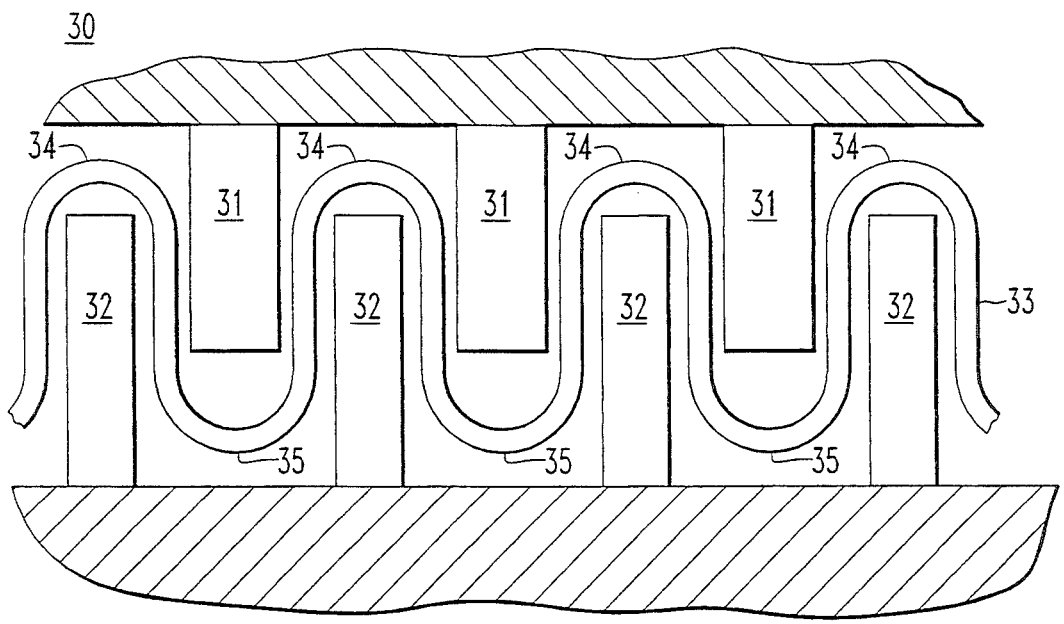
FIG. 4 illustrates a sectional view of a silver-iron battery cell containing the separator system of the present invention.

FIG. 4 shows a battery cell 30 having a plurality of positive silver electrode plates 31 and negative iron electrode plates 32. A separator 33 is provided between the silver electrode plates 31 and iron electrode plates 32 in a serpentine fashion. The separator 33 is arranged such that the polyethylene layer 34 is adjacent the silver electrode plate 31.

Preferably, the polyethylene layer 23 and cellophane layer 24 of separator 13 are flexible and noncrystalline. These layers are not deliberately bonded together with adhesives. However, layers 23 and 24 have an inherent tackiness and may be laminated if desired into an integral layer to aid in handling and cell assembly. One such system that has been tested involves a laminated layer of polyethylene: cellophane: polyethylene. However, laminates containing any number of layers are possible. One example of a low-density polyethylene layer 23 that can be used in the present invention is sold under the trade name "ZAMM-O" by "Pall-Rai Corp.".

Silver-iron battery cells traditionally have poor high power performance. Because the silver is soluble in the alkali electrolyte, a mechanical and chemical barrier is needed in the silver-iron battery cell. In the past, such as in Jackovitz et al., U.S. Pat. No. 4,804,598, the solution has been to use dense, cross-linked polyethylene in the separator. Such a cross-linked polyethylene layer provides chemical and thermal stability. However, such a layer has a lower ionic conductivity, thereby limiting its high power performance application. Moreover, such a separator has generally poor low temperature performance.

Figure 5:
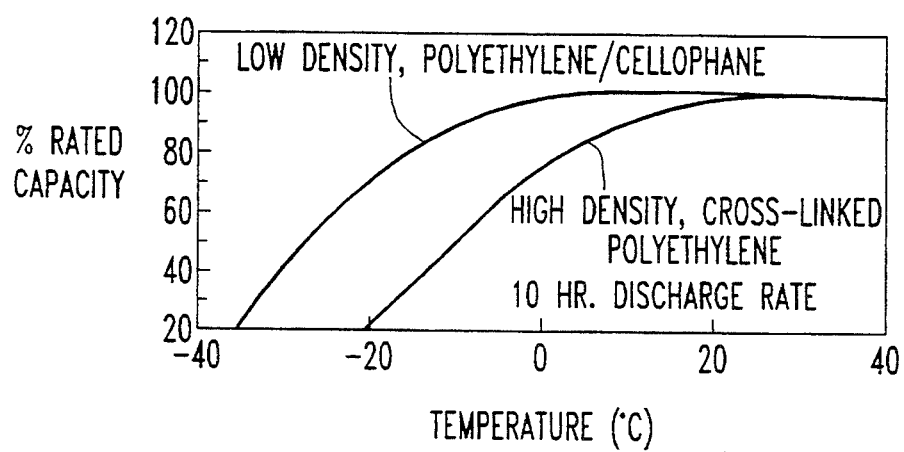
FIG. 5 is a graph showing a comparison between the capacity as a function of temperature of a battery using the separator of the present invention and a battery using a prior art separator.
Figure 6:
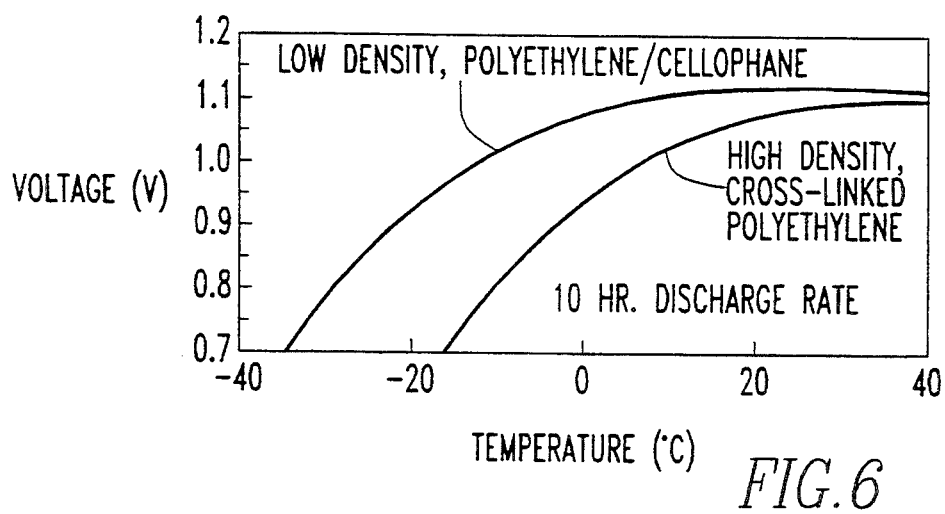
FIG. 6 is a graph showing a comparison of the voltage generated as a function of temperature for a battery cell using the present separator and a battery cell using a prior art separator.

By combining layers of low-density polyethylene film with cellophane film in alternating layers, the present separator overcomes the high power and low temperature performance drawbacks of the prior art. The present invention was tested using a four layer combination (polyethylene: cellophane: polyethylene: cellophane). The performance of this four-layer combination was compared with the performance of a high-density, cross-linked polyethylene separator formed in accordance with Jackovitz et al. U.S. Pat. No. 4,804,598, and known generally as PK-3060. The results of these comparisons are shown in FIGS. 5 and 6. FIGS. 5 and 6 show that the separator of the present invention provides greatly improved low temperature performance over the prior art separator.

The present separator has greatly expanded the utility of the silver-iron cell for high-rate or low-temperature applications. Previously, these applications had only been addressable using other aqueous systems such as nickel-cadmium or lead-acid, wherein none of the electrodes are soluble in the electrolyte. However, the nickel-cadmium and lead-acid systems possess energy densities less than one-quarter of the silver-iron system. By utilization of the present separator, high-rate, low-temperature applications are now available using a high energy density battery system.

Unlike in the prior art silver cells using cellophane film separators, the present separator 13' mechanically traps the cellophane layer 24 in place. The polyethylene layer 23 acts as a final barrier against positive and negative plate contact and prevents a hot short from occurring even after the cellophane layer 23 deteriorates.

In the foregoing specification certain preferred practices and embodiments of this invention have been set out, however, it will be understood that the invention may be otherwise embodied within the scope of the following claims.

We claim:

1. A separator for use in a silver-iron battery having a case and a cover within which are disposed at least one iron electrode and one silver electrode, said separator being provided between said at least one iron electrode and said at least one silver electrode, said separator consisting of:
   a. a first layer of low-density radiation-grafted polyethylene provided adjacent said at least one silver electrode; and
   b. a second layer of cellophane film provided immediately adjacent said first layer.

2. The separator of claim 1 wherein said separator further comprises at least one additional layer selected from the group consisting of a low-density radiation-grafted polyethylene layer and alternating layers of said first layer and said second layer.

3. A separator for use in a silver-iron battery having a case and a cover within which are disposed a plurality of iron electrodes extending from a first wall of said case and a plurality of silver electrodes extending from an opposite wall of said case, wherein said separator is arranged in a serpentine path between said plurality of iron electrodes and said plurality of silver electrodes, said separator comprising a first layer of low-density radiation-grafted polyethylene provided adjacent said plurality of silver electrodes and a second layer of cellophane film provided immediately adjacent said first layer.

4. A silver-iron battery having high power performance at low temperatures comprising:
   a. a case and a cover;
   b. at least one iron electrode disposed within said case and cover;
   c. at least one silver electrode disposed within said case and cover; and
   d. a separator provided between said at least one iron electrode and said at least one silver electrode, said separator consisting of a first layer of low-density radiation-grafted polyethylene provided adjacent said at least one silver electrode and a second layer of cellophane film provided immediately adjacent said first layer.

5. The battery of claim 4 wherein said separator further includes at least one additional layer selected from the group consisting of a low-density radiation-grafted polyethylene layer and alternating layers of said first layer and said second layer.

6. A silver-iron battery having high power performance at low temperatures comprising:
   a. a case and a cover;
   b. a plurality of iron electrodes disposed within said case and cover and extending from a first wall of said case;
   c. a plurality of silver electrodes disposed within said case and cover and extending from an opposite wall of said case; and
   d. a separator arranged in a serpentine path between said plurality of iron electrodes and said plurality of silver electrodes, said separator having a first layer of low-density radiation, grafted polyethylene provided adjacent said plurality of one silver electrodes and a second layer of cellophane film provided immediately adjacent said first layer.

* * * * *